No. 851,607. PATENTED APR. 23, 1907.
F. I. DU PONT.
MACHINE FOR MIXING AND TREATING PLASTIC SUBSTANCES.
APPLICATION FILED MAR. 9, 1904.

2 SHEETS—SHEET 1.

WITNESSES:

INVENTOR
Francis I. du Pont
BY
ATTORNEYS

No. 851,607. PATENTED APR. 23, 1907.
F. I. DU PONT.
MACHINE FOR MIXING AND TREATING PLASTIC SUBSTANCES.
APPLICATION FILED MAR. 9, 1904.

2 SHEETS—SHEET 2.

WITNESSES:

INVENTOR
Francis I. du Pont
BY
ATTORNEYS

UNITED STATES PATENT OFFICE.

FRANCIS I. DU PONT, OF WILMINGTON, DELAWARE.

MACHINE FOR MIXING AND TREATING PLASTIC SUBSTANCES.

No. 851,607.          Specification of Letters Patent.          Patented April 23, 1907.

Application filed March 9, 1904. Serial No. 197,226.

*To all whom it may concern:*

Be it known that I, FRANCIS I. DU PONT, a citizen of the United States, residing at Wilmington, county of Newcastle, and State of Delaware, have invented a new and useful Improvement in Machines for Mixing and Treating Plastic Substances, of which the following is a full, clear, and exact description, reference being had to the accompanying drawings, which form a part of this specification.

My invention has for its object the production of a machine which will effectually and thoroughly mix, disintegrate and compress plastic substances. Speaking generally, I attain this object by the use of a plurality of rolls provided on their periphery with projecting teeth, preferably sharp pointed or saw teeth, the rolls being in proximity to each other and the teeth on the rolls intermeshing with each other. The rolls are also caused to revolve at different rates of speed. The casing in which these rolls revolve is also provided with curved portions concentric to the rolls and of slightly greater radius than the apex of the teeth, so that at this portion of the revolution of the rolls the teeth approach closely to the casing. By this arrangement, the material acted on by the rolls is being continually disintegrated by being drawn between the rolls. It is then carried by the rolls between their surfaces and the curved surfaces of the casing so that it is compressed and rolled into lumps against the curved portion of the casing in discharging or throwing off the mass.

My invention also consists in various details of construction which will hereinafter be more fully described.

Figure 1:
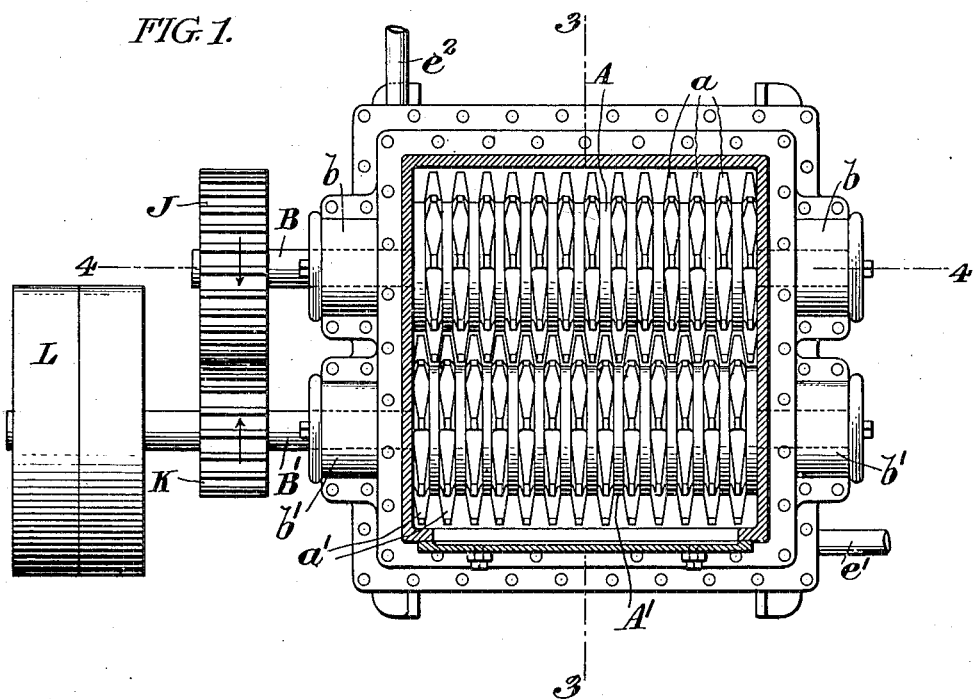
Figure 2:
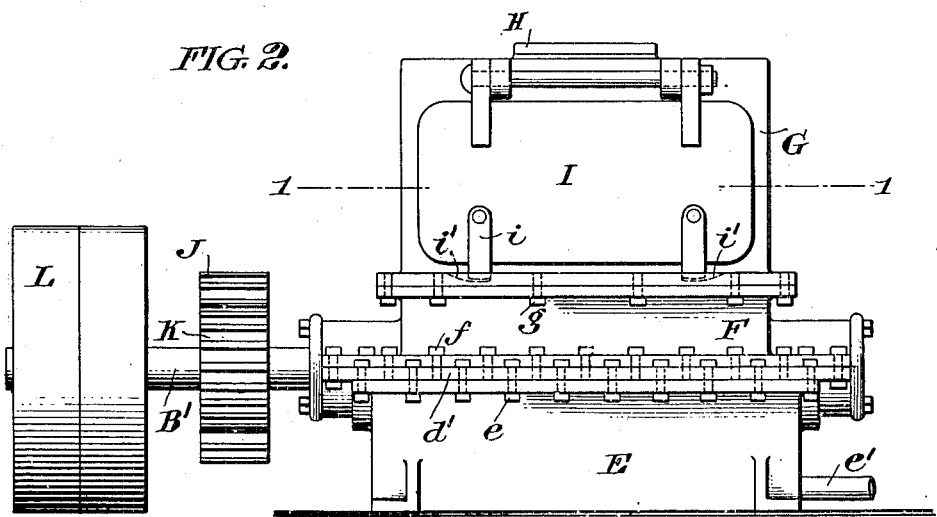
Figure 3:
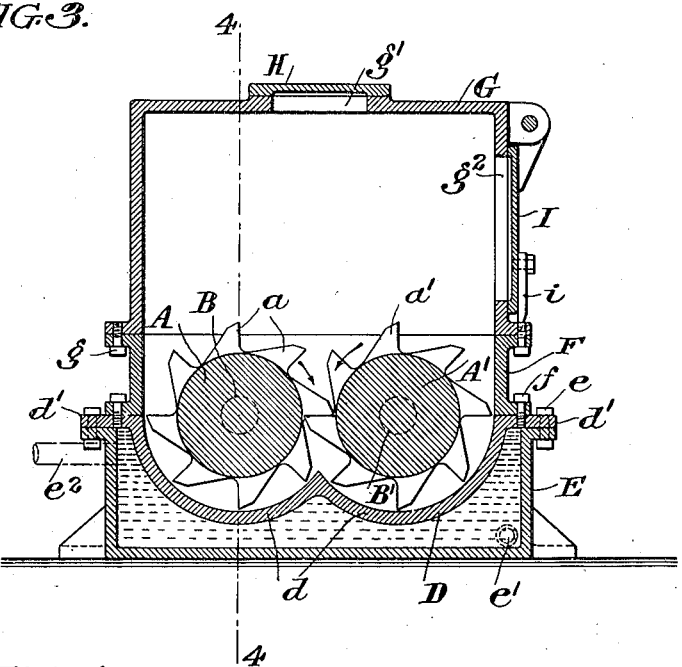
Figure 4:
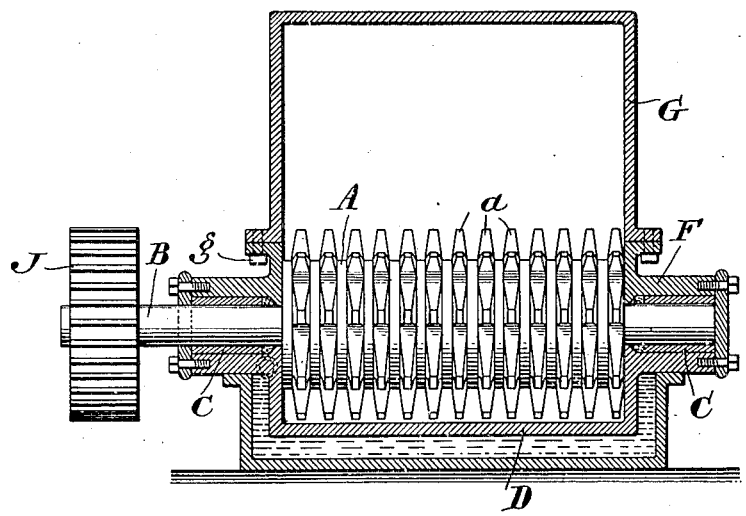

In the drawings:—Figure 1 is a sectional plan view of the machine taken on the line 1—1 Fig. 2. Fig. 2 is a side elevation of the machine. Fig. 3 is a transverse sectional view taken on the line 3—3, Fig. 1. Fig. 4 is a longitudinal sectional view taken on the line 4—4 Fig. 3.

The casing of the machine is formed of the parts D, F and G. The portion D is formed curved, as shown at $d$, and is provided with the flange $d'$, which rests upon and is secured by bolts $e$ to the tank, casting or base E. $e'$ is an inlet pipe to this tank E and $e^2$ an outlet from said tank. The purpose of this tank and its inlet and outlet is to provide a circulation of water or other cooling liquid for the purpose to be hereinafter fully described. The section or portion F is flanged at the top and bottom. It is secured by bolts $f$ to the flange of the portion D. The top portion G is provided with a flange at its lower end and through which and the upper flange of the portion F bolts $g$ pass to secure the two sections together.

A, A' are two rolls having, respectively, the shafts B, B'. These shafts are carried in journals $b$, $b'$, respectively, formed with the casing and in which are the stuffing boxes C. The lower half or portion of the journals for the shaft of each roll is formed integral with the portion D of the casing, while the upper half of the journals for each roll is formed integral with portion F of the casing. Upon the periphery of the roll A are teeth $a$, and upon the periphery of roll A' are teeth $a'$. The teeth upon one roll are out of alinement of the teeth on the other roll, and the rolls are in such position with reference to each other that the teeth of the two rolls intermesh. The teeth are preferably pointed or saw teeth. The rolls are so placed that the teeth revolve in proximity to the curved portions of the casing D, the radius of each curved portion being slightly greater than the radius of the apices of the teeth.

The top section G has a charging opening $g'$ which is fitted with a cover H. It has also a discharging opening $g^2$, which is fitted with a hinged door I, said door having the pivoted locking pieces $i$, which fit in recesses $i'$ in the casing G.

Upon the shaft B is the gear J and upon the shaft B' meshing with gear J is the gear K.

L are two pulleys, one loose, the other fast upon shaft B', the first pulley being driven by a belt not shown.

Preferably, to obtain the best results, the gears J and K have different diameters so that the shafts B and B', and their corresponding rolls A and A' revolve at different speeds.

Owing to the nature of a number of substances to be treated by the machine the casing is made closed and practically air-tight. In many cases also, while in course of treatment of the material under the action of the rolls, considerable heat is produced, and, to overcome this and to keep the temperature low, I constantly circulate through the tank E water, or a cooling liquid, which enters through inlet $e'$ and passes out through outlet $e^2$.

In the operation of the machine, the material to be treated is charged into the interior of the casing through the charging opening $g'$ until it is filled to about in line with the discharging opening. The rolls are then revolved toward each other, thus drawing the material between them and around in contact with the curved surfaces $d$ and discharges it at the outer side of the rolls. The action I obtain is that of tearing the material apart, or disintegrating it, and pressing it together, somewhat similar to the action of kneading. By this action the liquid, which generally forms a part of the mixture, is thoroughly and intimately admixed throughout all parts of the material, and the material will be discharged from the rolls formed into lumps of considerable size. This last result is obtained in a great measure by the rolling effect of the material between the rolls and the curved portions $d$. Practically the material is disintegrated in passing between the rolls and is then formed into lumps of considerable size in its passage between the rolls and the curved portions $d$. The teeth $a$ and $a'$ are made preferably sharp, or like saw-teeth, in order to thoroughly disintegrate the material in passing between the rolls.

Having now fully described my invention, what I claim and desire to protect by Letters Patent is—

1. In a machine of the character described, in combination, an air tight casing adapted to receive the material to be treated, coacting rolls having disintegrating surfaces in said casing, there being curved portions of the casing conforming to a portion of the periphery of the rolls, the rolls having a portion above and a portion adjacent to the curved casing portions, and means to revolve said rolls, whereby the material in the casing is disintegrated by passing between the rolls and carried between the rolls and curved casing surfaces, and means to maintain the material in the casing at a low temperature.

2. In a machine of the character described, in combination, an air tight casing adapted to receive the material to be treated, coacting rolls having disintegrating surfaces in said casing, there being curved portions of the casing conforming to a portion of the periphery of the rolls, the rolls having a portion above and a portion adjacent to the curved casing portions, and means to revolve said rolls, whereby the material in the casing is disintegrated by passing between the rolls and carried between the rolls and curved casing surfaces, the curved casing portion being water jacketed.

In testimony of which invention, I have hereunto set my hand, at Wilmington, on this 29th day of February, 1904.

FRANCIS I. DU PONT.

Witnesses:
    HENRY DRURY,
    D. M. MACDONALD.